(12) United States Patent
Tillgren et al.

(10) Patent No.: US 6,339,706 B1
(45) Date of Patent: Jan. 15, 2002

(54) WIRELESS VOICE-ACTIVATED REMOTE CONTROL DEVICE

(75) Inventors: Magnus Tillgren, Malmö; Göran Rundqwist, Staffanstorp, both of (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/438,326

(22) Filed: Nov. 12, 1999

(51) Int. Cl.$^7$ ................................................. H04M 3/00

(52) U.S. Cl. ........................ 455/419; 455/70; 455/563

(58) Field of Search ........................ 455/419, 420, 455/569, 69, 70, 563; 379/93.17, 102.3; 340/825.72; 359/145

(56) References Cited

U.S. PATENT DOCUMENTS

| | | | |
|---|---|---|---|
| 5,054,051 A | 10/1991 | Hoff | 379/56 |
| 5,426,689 A | 6/1995 | Griffith et al. | 379/58 |
| 5,793,865 A | 8/1998 | Leifer | 379/430 |
| 5,913,163 A | 6/1999 | Johansson | 455/426 |
| 6,078,825 A | * 6/2000 | Hahn | 455/569 |

FOREIGN PATENT DOCUMENTS

| | | | |
|---|---|---|---|
| EP | 0 554 625 | 8/1993 | |
| EP | 0 840 465 | 5/1998 | |
| EP | 0 892 534 | 1/1999 | |
| EP | 0921508 | 6/1999 | |
| GB | 2 333 420 | 7/1999 | |
| GB | 197 06 335 | 7/1999 | |
| JP | 6-334600 | 12/1994 | |
| JP | 06334600 | * 12/1994 | H04B/7/26 |
| WO | 95/06309 | 3/1995 | |
| WO | WO98/45997 | 10/1998 | |
| WO | WO99/01865 | 1/1999 | |

OTHER PUBLICATIONS

Contributing Authors, D. Childers et al., "Celebrating A Half Century of Signal Processing—The Past, Present, and Future of Speech Processing", IEEE Signal Processing Magazine, vol. 15, No. 3, May 1998, pp. 24–48.
Document from the website http://www.bluetooth.com created at least as early as Nov. 10, 1999.
Document from the website http://www.tdk.com/bluetooth created at least as early as Aug. 10, 1999.

* cited by examiner

Primary Examiner—Vivian Chang
Assistant Examiner—J Moore
(74) Attorney, Agent, or Firm—Burns, Doane, Swecker & Mathis, L.L.P.

(57) ABSTRACT

The present invention relates to a wireless, voice-activated remote control device for controlling an electronic device having voice control circuitry. A short-range range wireless data and voice communication link, for example using Bluetooth technology, is established between the remote control device and the electronic device. To activate voice control circuitry in the electronic device, a user supplies an input to the remote control device. In response to the user input, wireless link circuitry within the remote control device sends a control signal, for example an AT command, to the electronic device. The electronic device receives the control signal and transmits a control signal indicating the status of the electronic device. Once the voice control circuitry is activated, the user provides a voice command to the remote control device. The remote control device transmits the voice signal to the electronic device over the wireless communication link. The electronic device processes the voice signal in the voice control circuitry and generates instructions in response to the voice signal if recognized. The voice control circuitry is advantageously located within the electronic device and not within the remote control device to simplify the remote control device and to minimize the amount of power dissipated in the remote control device.

28 Claims, 6 Drawing Sheets

WIRELESS VOICE-ACTIVATED REMOTE CONTROL DEVICE

BACKGROUND

The present invention relates to a wireless, voice-activated remote control device and, more particularly, the control of an electronic device having voice control circuitry via a wireless communication link by voice and data signals from a remote control device.

The control of electronic devices has traditionally required the manual operation of dials, buttons, keyboards, keypads and the like. This can be an impractical, awkward or undesirable requirement for several reasons. For example, a person who is working, driving, or performing some other task requiring the use of his hands, may simultaneously attempt to use a communication device to call another person. This can be difficult at best, and dangerous at worst.

Additionally, as technology progresses, manufacturers of electronic devices are continually reducing the size of the devices, and thus also reducing the size of the keyboards, keypads or other mechanical interfaces. This reduction in size makes it difficult for users to easily input accurate information.

Even when a full size interface is available and no other activity is being performed, a manually operated interface can be problematic. For example, computer users are frequently required to perform repetitive hand motions that can lead to serious physical injury over time.

Voice recognition technology has been developed for use in electronic devices in response to these problems. In general, conventional voice recognition technology comprises a mechanism for receiving an input voice signal, comparing the input voice signal with stored voice signals, and determining if the input voice signal is sufficiently similar to any of the stored voice signals. If the determining step reveals a match, instructions or other data associated with the similar stored voice signal, such as a telephone number or device command, is generated by the device. However, conventional voice recognition technology has required that a user be sufficiently proximate to the electronic device to ensure that the voice signal is adequately received. In addition, conventional voice recognition technology requires that the user depress a button on the electronic device to activate the technology.

User headsets or other remote control devices have also been developed to permit a user to have his hands free to perform other tasks while communicating with an electronic device. Such headsets do permit the user to have some distance away from the device. However, such devices are tethered to the device via a wire or a wireless radio link requiring the user to sustain relatively close proximity to the device. In application, such headsets typically must be used within one meter or so of the electronic device.

Those conventional headsets and other remote control devices provide marginal improvement at best because situations often arise in which a user desires to utilize an electronic device when the user is not sufficiently close to the device and/or the user is not able to utilize the small mechanical interface. For example, with respect to a communication device such as a telephone, a person may desire to receive an incoming call when the telephone starts ringing even though the telephone is some distance away. Alternatively, a person may desire to place a call on a small device, such as a cellular telephone, without having to input information using the small keypad associated with the device.

Thus, there exists a need for a wireless voice-activated remote control device that enables a user to activate an electronic device using voice control technology without having to maintain a small distance between the remote control device and the electronic device. There is no current technology that integrates voice recognition technology and a wireless remote control device to control an electronic device at a relatively large distance.

SUMMARY OF THE INVENTION

Accordingly, the present invention overcomes these and other problems associated with current technology by providing a wireless, voice-activated remote control system for controlling an electronic device. The system comprises an electronic device, a remote control device, and a wireless communication link. The electronic device comprises a microphone, a speaker, an antenna, wireless link circuitry, and voice control circuitry. The remote control device comprises a microphone, a speaker, an antenna, wireless link circuitry, and a user input device. The wireless communication link exists between the electronic device and the remote control device to facilitate the transmission of data signals and voice signals. At least one voice signal is input into the microphone of the remote control device. The voice signal is transmitted from the remote control device to the electronic device via the wireless communication link. Upon receipt of the voice signal at the electronic device, the voice control circuitry generates an instruction responsive to the voice signal and the instruction is executed in the electronic device.

In an alternative embodiment, the present invention provides a method of controlling an electronic device with a remote control device. The method comprises establishing a wireless communication link between the electronic device and the remote control device over which data signals and voice signals may be transmitted. The method further comprises receiving a voice signal at the remote control device and transmitting the voice signal from the remote control device to the electronic device via the wireless communication link. The method still further comprises receiving the voice signal at the electronic device, generating an instruction responsive to the voice signal in the electronic device, and executing the instruction in the electronic device.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION

These and other aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits, by program instructions being executed by one or more processors, or by a combination of both. Moreover, the invention can additionally be considered to be embodied entirely within any form of computer readable storage medium having stored therein an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiment may be referred to herein as "logic configured to" perform a described action.

In general, the invention relates to a wireless, voice-activated remote control system including a remote control device, an electronic device to be controlled and a wireless communication link. The remote control device receives the sound of a voice. The voice may be any suitable audio signal, whether it is generated by a living being or by a machine. The remote control device converts this sound into a voice signal, and transmits the voice signal to the electronic device over the wireless communication link. The electronic device receives the voice signal and processes the voice signal with voice control circuitry. The electronic device then generates instructions associated with the voice signal. In one embodiment of the invention, the voice control circuitry is located within the electronic device and not in the remote control device. This simplifies the remote control device, allowing the remote control device to be small and lightweight. In addition, this arrangement permits the remote control device to dissipate only a minimal amount of power.

The present invention can be implemented in a variety of different home and industrial applications. Exemplary electronic devices to be controlled include, but are not limited to, computers, televisions, telephones, stereos, garage door openers, vacuum cleaners, home appliances, business equipment, robots, assembly lines and associated machinery, and motor vehicles. For exemplary purposes, the present invention is described in connection with the control of a mobile telephone.

Figure 1:
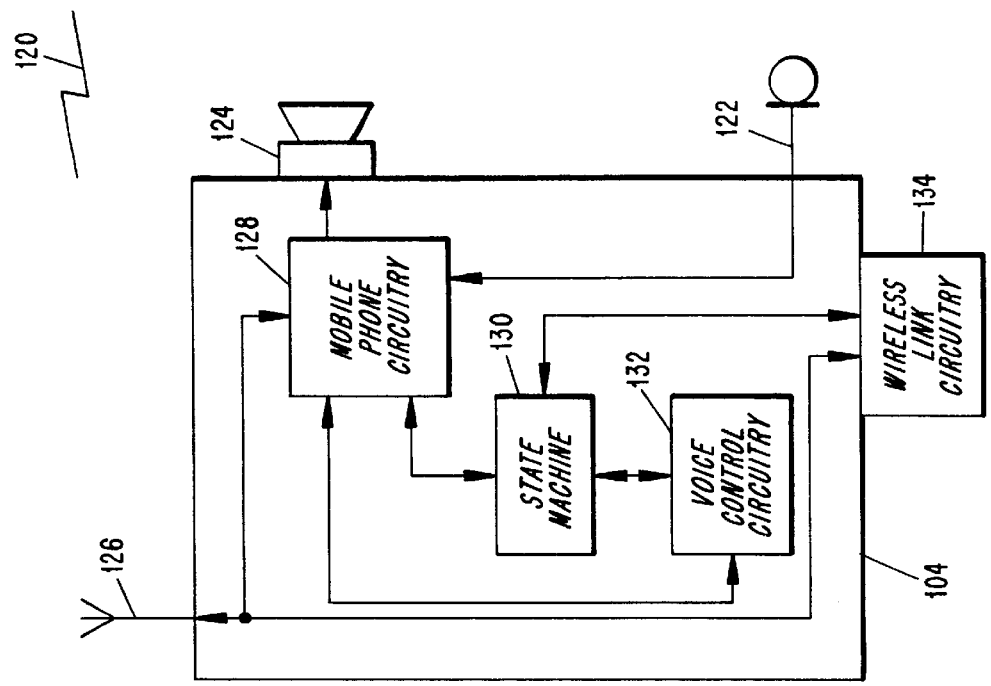
FIG. 1 shows a block diagram of a remote control device and a mobile telephone according to an embodiment of the present invention.
Figure 1:
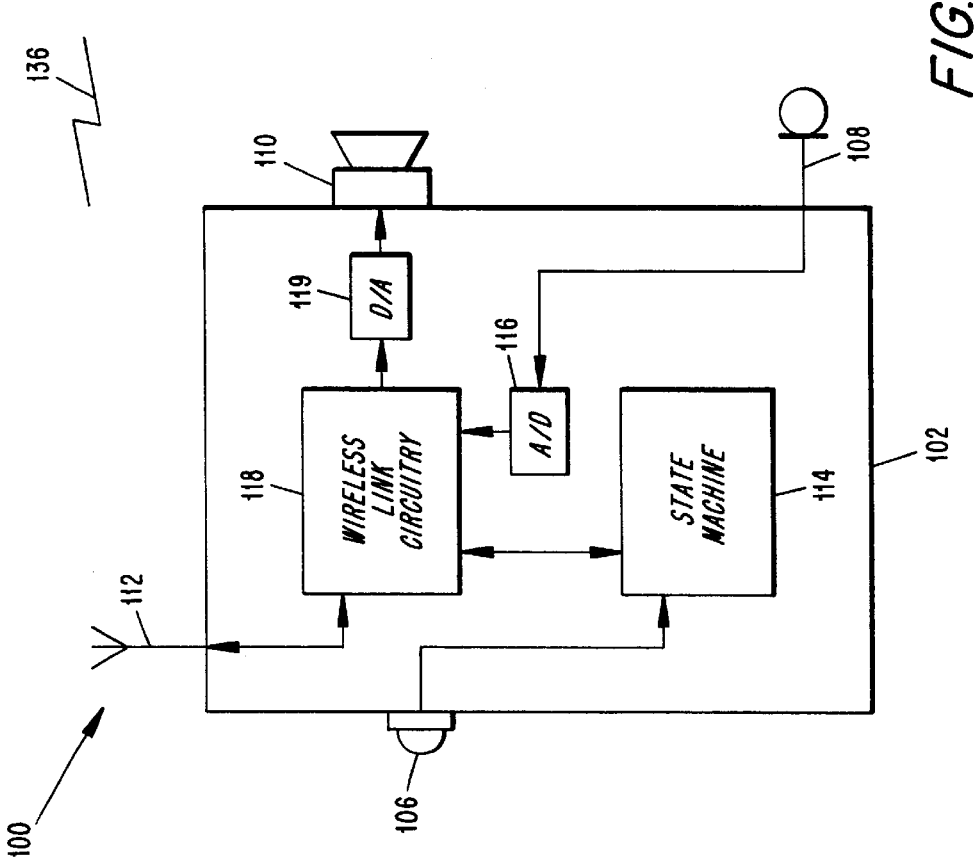

FIG. 1 shows a block diagram of a wireless, voice-activated remote control system 100 including a remote control device 102, such as a headset or wrist device, and an electronic device, exemplified here by a mobile telephone 104, according to one embodiment of the present invention. Remote control device 102 includes an input device or button 106 (which enables a user to manually activate a switch, not shown), a microphone 108, a speaker 110 and an antenna 112. Remote control device 102 also includes a state machine 114, an analog-to-digital (A/D) converter 116, and wireless link circuitry 118. Remote control device 102 may also include other clips, buttons, VELCRO, bands, straps, pads or the like (not shown) to facilitate attachment to a user.

Mobile telephone 104 could be any type of cellular telephone, now known or later developed, using any type of transmission technique for communication with other communication devices such as satellites, base stations, plain old telephones, or other mobile phones over a wireless communication link 120. Mobile telephone 104 includes a microphone 122, a speaker 124 and an antenna 126. Mobile telephone 104 also includes a mobile telephone circuitry 128, a state machine 130, and voice control circuitry 132. The mobile telephone circuitry 128 performs all functions necessary to enable the mobile telephone 104 to establish and utilize the wireless communication link 120. For example, the mobile telephone circuitry 128 may be particularly adapted to work in accordance with Global System for Mobile communications (GSM) standards, which are well known. Of course, the use of GSM is merely exemplary, and is not essential to the invention; in alternative embodiments the mobile telephone circuitry 128 may operate in accordance with any other mobile communications standards.

Figure 2:
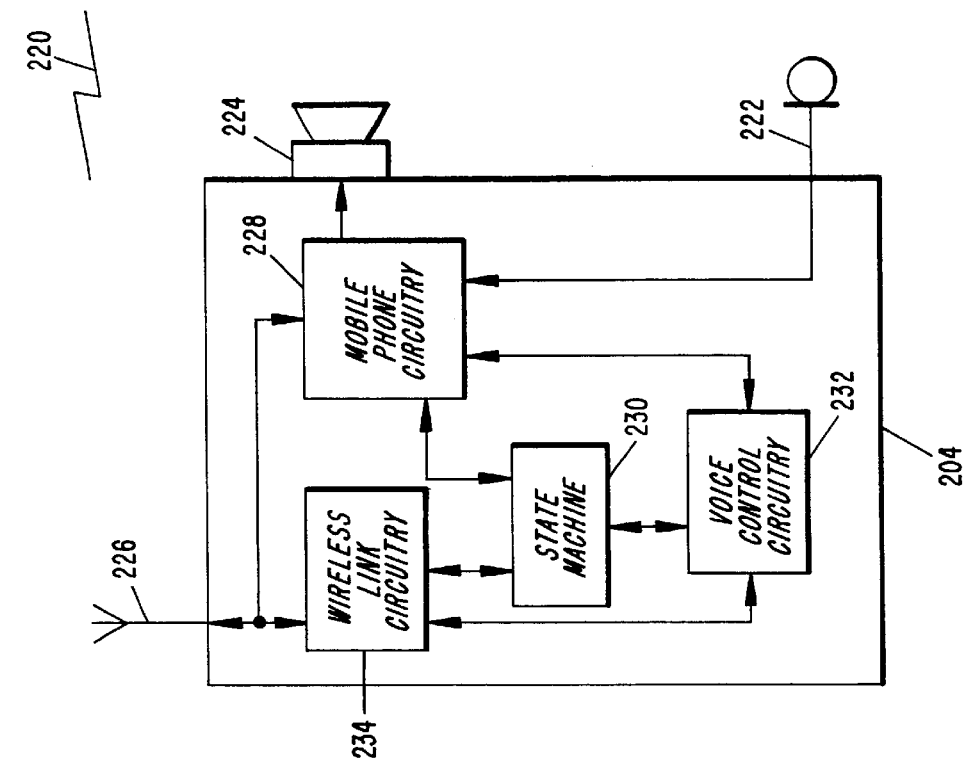
FIG. 2 shows a block diagram of a remote control device and a mobile telephone according to an alternative embodiment of the present invention.
Figure 2:
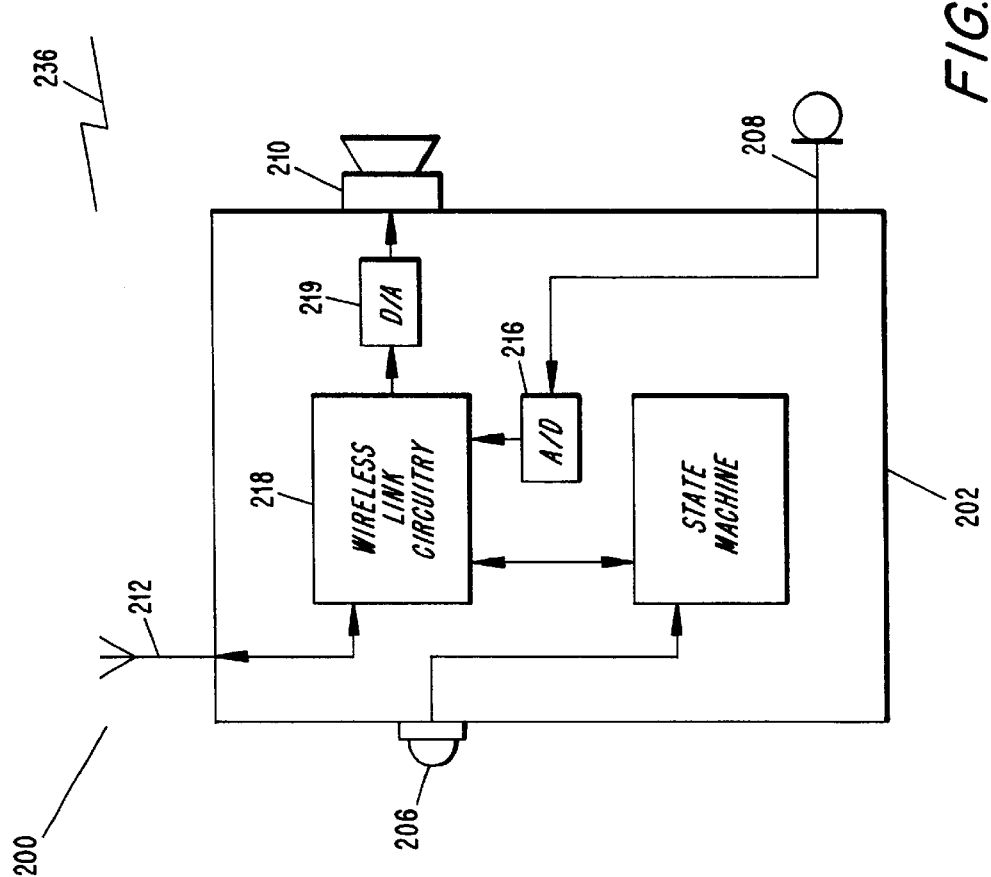

In addition to the above mentioned components, mobile telephone 104 includes wireless link circuitry 134. The purpose of the wireless link circuitry 134 is to establish a second wireless link, independent of the wireless communication link 120. The purpose of this second wireless link will be further described below. Wireless link circuitry 134 can be connected to mobile telephone 104 through a plug connection as shown in FIG. 1. Alternatively, wireless link circuitry 234 can be included within mobile telephone 204, as shown in FIG. 2.

Referring back to FIG. 1, remote control device 102 communicates with mobile telephone 104 via a wireless communication link 136, which is the second wireless link referred to above. An exemplary wireless communication link suitable for use as the wireless communication link 136 can be established using Bluetooth technology, which is well known.

Bluetooth technology was introduced to provide pervasive connectivity especially between portable devices like mobile phones, laptops, personal digital assistants (PDAs), and other nomadic devices up to a range of approximately 10–100 meters. This system applies frequency hopping to enable the construction of low-power, low-cost radios with a small footprint. The system supports both data and voice. The latter is optimized by applying fast frequency hopping in combination with a robust voice coding. The fast frequency hopping has a nominal rate of 800 hops per second (hops/s) through the entire 2.4 GHz ISM band, which is 80 MHZ wide. The system also uses Forward Error Correction (FEC) to limit the impact of random noise on long distance links.

Devices based on the Bluetooth system concept can create so called piconets, which comprise a master device and one or more slave devices connected via the FH piconet channel. The FH sequence used for the piconet channel is completely determined by the address or identity of the device acting as the master. The system clock of the master device determines the phase in the hopping sequence (i.e., the designation of which one of the possible hops in the sequence is the "current" hop). In the Bluetooth system, each device has a free-running system clock. Each of the slave devices adds a corresponding time offset to its clock that enables it to become aligned with the clock of the master device. By using the master address to select the proper hopping sequence and by using the time offset to align to the master clock, each slave device keeps in hop synchrony to the master device; that is, master and slave devices remain in contact by hopping synchronously to the same hop frequency or hop carrier.

The hop sequences used in the Bluetooth system are generated through a hop selection mechanism. With this mechanism, hop carriers are generated "on the fly". The mechanism has no inherent memory: address and clock information instantaneously determine the sequence and phase and therefore directly determine the desired hop carrier. The advantages of such a selection scheme are numerous. By changing address and clock, a device can jump from one FH piconet channel controlled by one address/clock combination to another piconet controlled by another address/clock combination.

More information about the Bluetooth technology specification can be found on the Internet at www.bluetooth.com.

Referring back to FIG. 1, system 100 permits remote control device 102 to utilize wireless communication link 136 to transmit control signals to mobile telephone 104, for example, to place a call, or to receive control signals from mobile telephone 104, for example, to answer a call. Remote control device 102 may transmit one or more control signals to mobile telephone 104 to elicit many types of responses from mobile telephone 104. In addition to placing a call or receiving a call, such a response might be to determine the status of mobile telephone 104, to activate circuitry in mobile telephone 104, to receive any information about mobile telephone 104 or to control mobile telephone 104.

If a user desires to place a call from remote control device 102 using mobile telephone 104, the user depresses button 106 to establish wireless communication link 136. Upon depressing button 106, the state machine 114 provides suitable control signals to the wireless link circuitry 118 that cause the wireless link circuitry 118 to establish wireless communication link 136 with its counterpart wireless link circuitry 134 coupled to the mobile telephone 104. The wireless communication link 136 is preferably established as a voice and data link.

Link circuitry 118 may advantageously be embodied as Bluetooth technology which has standardized special packets for transmitting voice signals. In this case, link circuitry 118 establishes a dynamic wireless communication link 136 which involves either remote control device 102 or electronic device 104 assuming the role of master. For example, if remote control device 102 is the master, electronic device 104 is the slave. Bluetooth technology permits other slaves to be added or deleted as desired. Master remote control device 102 and slave electronic device 104 synchronize by exchanging clock values. Master remote control device 102 and slave electronic device 104 also agree on a frequency hopping sequence and phase (i.e., which of the hops constitutes a present hop within a frequency hopping sequence).

Once wireless communication link 136 is established, mobile telephone 104 returns a control signal indicating the operational status of the phone. The phone status may be "idle" if mobile telephone 104 is not currently in communication with another device over wireless communication link 120. Other mobile telephone states include "incoming call" and "ongoing call". As the status changes, mobile telephone 104 communicates this new status information to remote control device 102 via the wireless communication link 136. These statuses, and other control signals are discussed in more detail below with reference to FIG. 3. Mobile telephone 104 also returns an "OK" control signal indicating that mobile telephone 104 is capable of receiving additional control signals from remote control device 102. The user may then supply a voice command, e.g., "Call Mom," to microphone 108. The voice command is supplied to an analog-to-digital (A/D) converter 116, which converts the analog voice command into a digital voice signal. The digital voice signal travels from A/D converter 116 to wireless link circuitry 118.

After suitable modulation and encoding, the digital voice signal travels from wireless link circuitry 118 and antenna 112 to antenna 126 over wireless communication link 136. Antenna 126 receives the digital voice signal and sends the digital voice signal to wireless link circuitry 134. After suitable demodulation and decoding (as required), link circuitry 134 transmits the digital voice signal to voice control circuitry 132. Voice control circuitry 132 includes a digital signal processor, voice recognition algorithms, stored voice signals, voice comparison algorithms and voice instruction tables for analyzing the digital voice signal as discussed above. Voice control circuitry 132 may operate, for example, by receiving the digital voice signal and comparing the digital voice signal with stored voice signals. Voice control circuitry 132 then determines if the digital voice signal is sufficiently similar to any of the stored voice signals. If the determination reveals a match, voice control circuitry 132 generates instructions, or other data, associated with the similar stored voice signal, such as "Mom's" telephone number. Mobile telephone 104 then initiates communication over wireless communication link 120 utilizing Mom's telephone number. As mentioned earlier, wireless communication link 120 may be a GSM connection or any other mobile telephone communication link. Assuming that she answers her telephone, thereby completing establishment of the wireless communication link 120, voice signals from "Mom" are transmitted from her telephone via wireless communication link 120 to the mobile telephone 104, and then (after suitable modulation and possible encoding) from mobile telephone 104 to remote control device 102 over wireless communication link 136. The voice signals are transmitted from antenna 112 to wireless link circuitry 118 which performs suitable demodulation and decoding, and then supplies the resultant voice signals to speaker 110. If the voice signals are digital, the digital voice signals are converted to analog voice signals by digital-to-analog (D/A) converter 119 prior to being supplied to speaker 110.

If the determination does not reveal a match, no instructions are generated and no communication over wireless communication link 120 occurs.

Providing voice control circuitry 132 in mobile telephone 104 is advantageous over providing voice control circuitry in remote control device 102 because mobile telephone 104 typically has more processing power than remote control device 102. In addition, providing voice control circuitry 132 in mobile telephone 104 rather than in remote control device 102 enables remote control device 102 to be lighter and smaller.

As stated above, system 100 also permits remote control device 102 to utilize wireless communication link 136 to receive control signals from mobile telephone 104, for example, to answer a call coming over wireless communication link 120. In this case, it is mobile telephone 104 that establishes wireless communication link 136 with remote control device 102 by exchanging control signals in a manner similar to that described above. Wireless communication link 136 is a voice and data link. The user can decide to answer the call or not to answer the call. In the event that the user desires to answer the call, the user depresses button 106 with a short keypress, or gives a voice command to that effect. If a keypress is given, state machine 114 generates suitable control signals for causing wireless link circuitry 118 to transmit suitable control signals to mobile telephone to indicate that the call is accepted. If a voice command is given, the voice command is converted from an analog signal to a digital signal in A/D converter 116 and transmitted to mobile telephone 104 in a manner similar to that described above. In this case, voice control circuitry 132 recognizes that the user has accepted the call, and responds by generating suitable signals for causing state machine 130 to perform necessary actions for completing establishment of the wireless communication link 120. The informational content of the call is subsequently transmitted from mobile telephone 104 to remote control device 102, where the user can hear it via loudspeaker 110. The user's voice is similarly picked up via microphone 108 and conveyed to the mobile telephone 104 via wireless communication link 136. The mobile telephone 104 forwards this voice information to the other (calling) party via wireless communication link 120.

If the user desires not to answer the call, the user depresses button 106 with a long keypress, or gives a voice command to that effect. If a keypress is given, statem machine 114 causes remote control device 102 to transmit corresponding control signals to mobile telephone 104 to indicate that the call is rejected. If, alternatively, a voice command is given, the voice command is converted from an analog signal to a digital signal in A/D converter 116 and transmitted to mobile telephone 104 in a manner similar to that described above. The mobile telephone 104 then takes appropriate actions in response to control signals generated by the voice control circuitry acting in conjunction with state machine 130. Having declined to accept the call, no call-related (e.g., voice) information would be transmitted to remote control device 102.

The embodiment depicted in FIG. 2 is identical to that depicted in FIG. 1, except for the incorporation of wireless link circuitry 234 within the mobile telephone 204. In this case, it is unnecessary to utilize a connector for coupling signals between circuitry within the mobile telephone 204 and the wireless link circuitry 234. The wireless link circuitry 234 otherwise operates the same as the wireless link circuitry 134 described above. Furthermore, the remaining components, herein assigned reference numerals 2xx, operate the same as their counterparts, assigned reference numerals 1xx, which are described above. Accordingly, no further description of FIG. 2 need be given here. Furthermore, in the following discussion, reference is made to components illustrated in FIG. 1. It should be recognized, however, that these references could also be made to counterpart components illustrated in FIG. 2.

Figure 3:
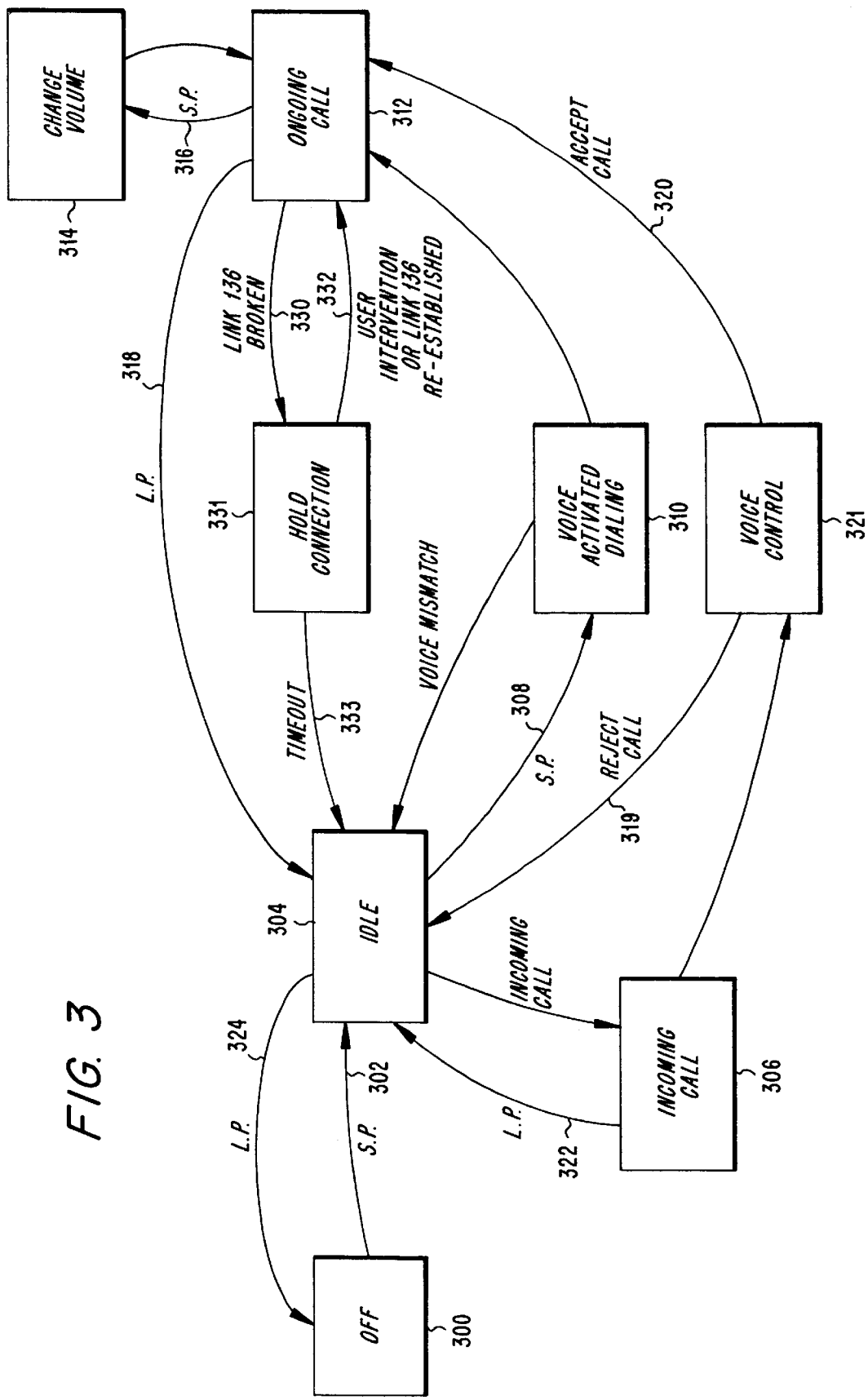
FIG. 3 shows a state diagram of a state machine according to an embodiment of the present invention.

FIG. 3 shows a state diagram of state transitions carried out by state machine 114 of remote control device 102 according to an embodiment of the present invention. With reference to both FIGS. 1 and 3, the various states of state machine 114 will now be described. State machine 114 begins in state OFF 300. When a user desires to use remote control device 102 to place a call through mobile telephone 104, the user depresses button 106 for a short press 302 to establish short-range wireless communication link 136. A short press requires depressing button 106 for a short amount of time relative to a long press. For example, a short press might require user contact with button 106 for less than two seconds, while a long press might require user contact with button 106 for more than two seconds.

In the following discussion, signaling between the remote control device 102 and the mobile communication device 104 is described. In all communications between remote control device 102 and mobile telephone 104, it is presumed that wireless communication link 136/236 is utilized. Furthermore, unless otherwise specified, control signals received by the remote control device 102 and the mobile telephone 104 are decoded by their respective state machines 114, 130, which generate suitable internal control signals and next states based on a present state and the received control signal. In each of the remote control device 102 and mobile telephone 104, the internal control signals cause the respective device to operate in a desired way, possibly including generation and transmission of other control signals.

Upon depressing button 106 for short press 302, state machine 114 causes wireless link circuitry 118 to transmit a control signal, such as AT command AT+CPAS, to mobile telephone 104. In response, mobile telephone 104 transmits a control signal, such as AT command AT+CPAS:n to remote control device 102. The "n" indicates the operational status of mobile telephone 104. Mobile telephone 104 may have a status of idle 304, incoming call 306, or ongoing call 312. Remote control device 102 stores the operational status in memory (not shown). Mobile telephone 104 then transmits to remote control device 102 an "OK" signal indicating that communication between remote control device 102 and mobile telephone 104 can proceed.

Remote control device 102 then sends a control signal, such as AT command AT*ECAM=1, instructing mobile telephone 104 to transmit control signals, such as AT command *ECAV, to remote control device 102 indicating that the telephone status is changed, if applicable. Mobile telephone 104 then transmits to remote control device 102 an "OK" signal. In the event a control signal, such as AT command *ECAV, is received from mobile telephone 104 indicating that the telephone status has changed, state machine 114 changes states accordingly to match the changed telephone status.

When mobile telephone 104 is in an idle state 304, remote control device 102 may transmit different control signals to alternatively initiate a call using voice activated dialing 310, receive an incoming call 306, or terminate wireless communication link 136.

In some embodiments, there may be no available dedicated command to initiate voice activated dialing 310. In this case, it is necessary to emulate key strokes to initiate voice activated dialing 310. In this case, the user depresses button 106 with a short press 308. Upon depressing button 106, remote control device 102 transmits one or more control signals. Remote control device 102 may first confirm that the phone is in the idle state. To do so, remote control device 102 transmits a control signal, such as AT command, AT+CKPD="EEEE", to emulate four presses of a NO button, or any other suitable button, for exiting menus of mobile telephone 104. Mobile telephone 104 then transmits to remote control device 102 an "OK" signal indicating that communication between remote control device 102 and mobile telephone 104 can proceed.

Remote control device 102 then transmits a control signal, such as AT command AT+CKPD="S",40, to simulate a long keypress of a YES button, or any other suitable button, of mobile telephone 104. Mobile telephone 104 receives the control signal and accordingly activates voice control circuitry 132. Mobile telephone 104 then transmits to remote control device 102 an "OK" signal indicating that voice control circuitry 132 has been activated and that communication between remote control device 102 and mobile telephone 104 can proceed.

In other embodiments, it may be necessary to emulate more or fewer presses, depending upon the particular configuration of the mobile telephone 104.

Alternatively, remote control device 102 may transmit a control signal which initiates voice activated dialing directly without emulating keypresses as discussed above. For example, to initiate voice activated dialing 310, the user depresses button 106 with a short press 308. Upon depressing button 106, remote control device 102 transmits a control signal, such as AT command AT*EVAD, to mobile telephone 104. Mobile telephone 104 receives the control signal and accordingly activates voice control circuitry 132. Mobile telephone 104 then transmits to remote control device 102 an "OK" signal indicating that voice control circuitry 132 has been activated and that communication between remote control device 102 and mobile telephone 104 can proceed.

Once the voice activated dialing 310 is initiated, the user can supply a voice command or signal to microphone 108 indicating the name of a third party such as a person, business or other entity, that the user desires to contact. The voice signal is converted to a digital voice signal and is transmitted to mobile telephone 104 as described above. If mobile telephone 104 establishes wireless communication link 120 with the third party, mobile telephone 104 enters the ongoing call status 312. Mobile telephone 104 transmits to remote control device 102 the third party voice signals received over wireless communication link 120. These third party voice signals are transmitted to speaker 110.

In the event the voice signal is not recognized by voice control circuitry 132, the call is not placed to the third party. Mobile telephone 104 returns to idle status 304 and transmits a signal to remote control device 102 indicating that no call was placed.

While in ongoing call status 312, the user may adjust the volume of voice signals being received from mobile telephone 104. By depressing button 106 with one or more short presses 316, and entering change volume status 314, a control signal, such as an AT command, can be sent to mobile telephone 104 to change the amplitude of the third party voice signals. Alternatively, by depressing button 106, a control signal is transmitted to circuitry within remote control device 102 to change the amplitude of the received third party voice signals. Once the volume has been adjusted to the satisfaction of the user, mobile telephone 104 returns to ongoing call status 312.

Mobile telephone 104 remains in ongoing call status 312 until the call is terminated, or, in other words, wireless communication link 136 is voluntarily broken. The user may terminate the call by depressing button 106 with a long press 318. By depressing button 106, remote control device 102 transmits a control signal, such as an AT command. Mobile telephone 104 then breaks the wireless communication link 120 and the wireless communication link 136 and returns to idle status 304.

If wireless communication link 136 is undesirably broken 330, for example because the distance between remote control device 102 and mobile telephone 104 becomes too great, wireless communication link 120 will remain connected for an additional predetermined time period (state 331), for example, thirty seconds, so that the user can continue the telephone call through mobile telephone 104 instead of remote control device 102. The voice channels are given back to the mobile telephone 104 and a message may be shown on the mobile telephone's display (not shown). The user may confirm 332 that he or she wishes to continue the call by activating one or more keys on the mobile telephone's keypad (not shown). If the user fails to intervene within the timeout period, a timeout will occur 333, the wireless communication link 120 will be broken and the mobile telephone 104 returns to idle mode 304.

In another aspect of the invention, if the remote control device becomes reconnected 332 during the predetermined period of time, the timer function within the mobile telephone 104 may be discontinued, and the voice channels again routed to the remote control device via wireless communication link 136.

To respond to an event, such as receiving an incoming call at remote control device 102 from mobile telephone 104, the user can either give a voice command or depress button 106 with a short press 320. In the case that mobile telephone 104 is in voice control status 321 because voice control circuitry 132 is activated at the time the incoming call is incoming, the user may give a voice command to accept 320 or reject 319 the call. The processing of this voice command is similar to that described above with respect to other voice commands. If the call is accepted, mobile telephone 104 is placed into ongoing call status 312. If the call is rejected, mobile telephone 104 returns to idle status 304. Mobile telephone 104 then transmits to remote control device 102 an "OK" signal indicating that communication between remote control device 102 and mobile telephone 104 can proceed.

Figure 4:
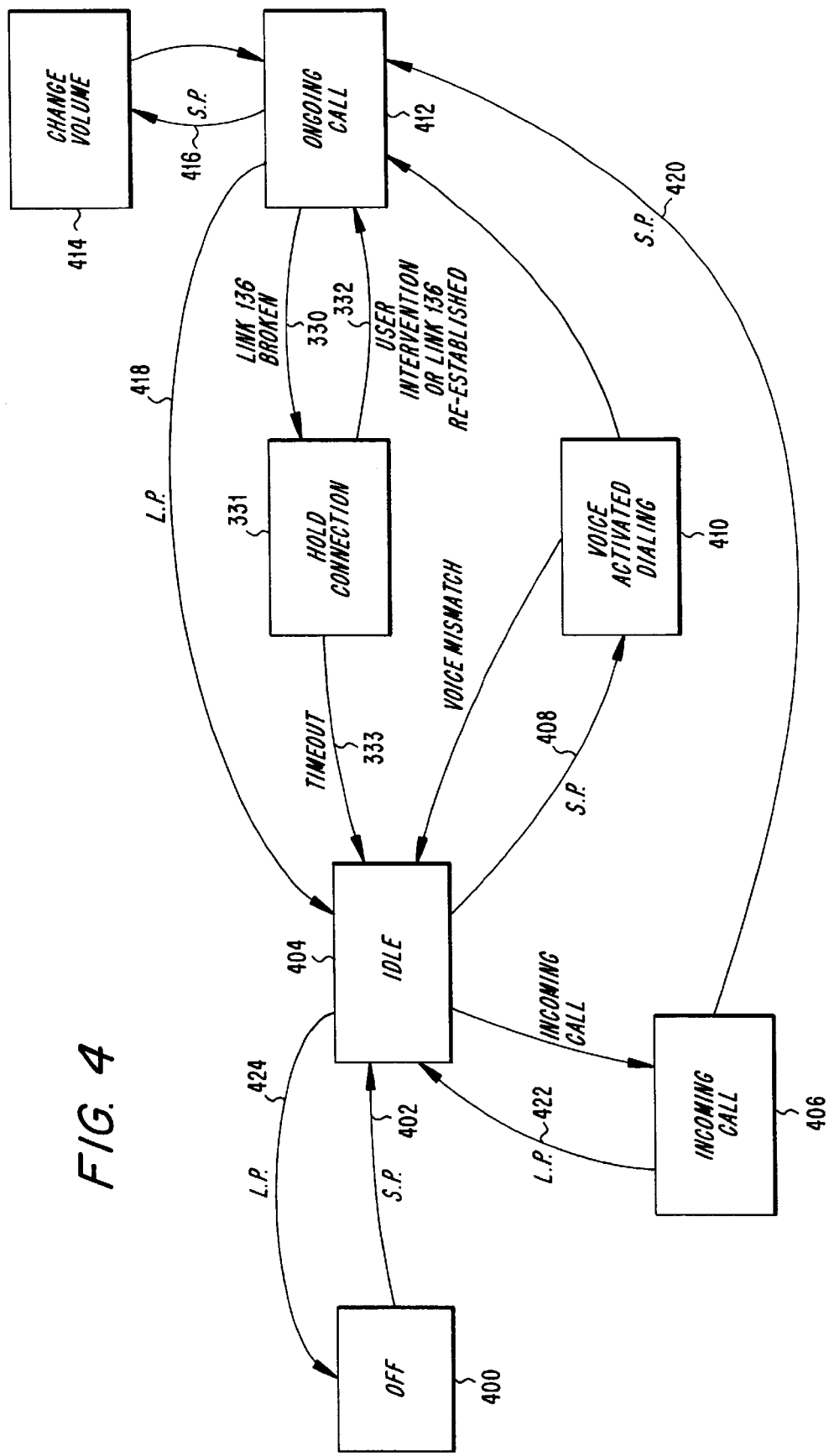
FIG. 4 shows a state diagram of a state machine according to an alternative embodiment of the present invention.

Alternatively, as shown in FIG. 4, if the mobile telephone 104 is not in voice control status 321 because voice control circuitry 132 is not activated, the system can be configured such that a short press 420 of button 106 accepts the incoming call. Upon depressing button 106, remote control device 102 transmits a control signal, such as AT command ATA, to mobile telephone 104 to accept the incoming call and to place mobile telephone 104 into ongoing call status 312.

If mobile telephone 104 indicates to remote control device 102 that an event has occurred, such as an incoming call has been received, and the user does not desire to accept the call, the user can depress button 106 with a long press 322. Upon depressing button 106, remote control device 102 transmits a control signal to mobile telephone 104 indicating that the call is not accepted by remote control device 102. Mobile telephone 104 then returns to idle status 304. Mobile telephone 104 transmits to remote control device 102 an "OK" signal indicating that communication between remote control device 102 and mobile telephone 104 can proceed.

To determine information about keypresses at mobile telephone 104, remote control device 102 transmits a control signal, such as AT command AT+CKEV=3,2 to mobile telephone 104. Mobile telephone 104 receives the control signal. If a key on mobile telephone 104 is pressed, mobile telephone 104 transmits a control signal, such as AT command +CKEV, to remote control device 102. Mobile telephone 104 then transmits to remote control device 102 an "OK" signal indicating that communication between remote control device 102 and mobile telephone 104 can proceed.

The user may terminate wireless communication link 136. If mobile telephone 104 is in idle status 304, the user may terminate wireless communication link 136 and wireless communication link 120 by depressing button 106 with a long keypress 324. Upon depressing button 106, remote control device 102 transmits a control signal, such as AT command AT*ECBP\r, to mobile telephone 104 to close wireless communication link 136. Mobile telephone 104 receives this control signal and terminates wireless communication link 136 and wireless communication link 120.

In the event mobile telephone 104 transmits a telephone status indicating that a call over wireless communication link 120 has ended, remote control device 102 transmits a control signal, such as AT command AT*EHNG to mobile telephone 104 to close wireless communication link 136. Mobile telephone 104 receives this control signal and terminates wireless communication link 136.

In the event mobile telephone 104 transmits information indicating that a button, such as the "#" button, has been depressed, remote control device 102 transmits a control signal, such as AT command AT*EHND to mobile telephone 104 for handover. In this case, wireless communication link 136 is closed and wireless communication link 120 remains connected and continues in mobile telephone 104. Mobile telephone 104 receives this control signal, terminates wireless communication link 136, and continues receiving voice and data signals over wireless communication link 120. A new wireless communication link 136 can be established by remote control device 102 as described above.

Transition-causing signals illustrated in the above state diagrams can be implemented using any suitable communication protocol. For example, transitions in the above state diagram can be responsive to a series of AT commands as discussed above. However, such AT commands may differ depending upon the particular mobile telephone and the particular remote control device being utilized.

Figure 5:
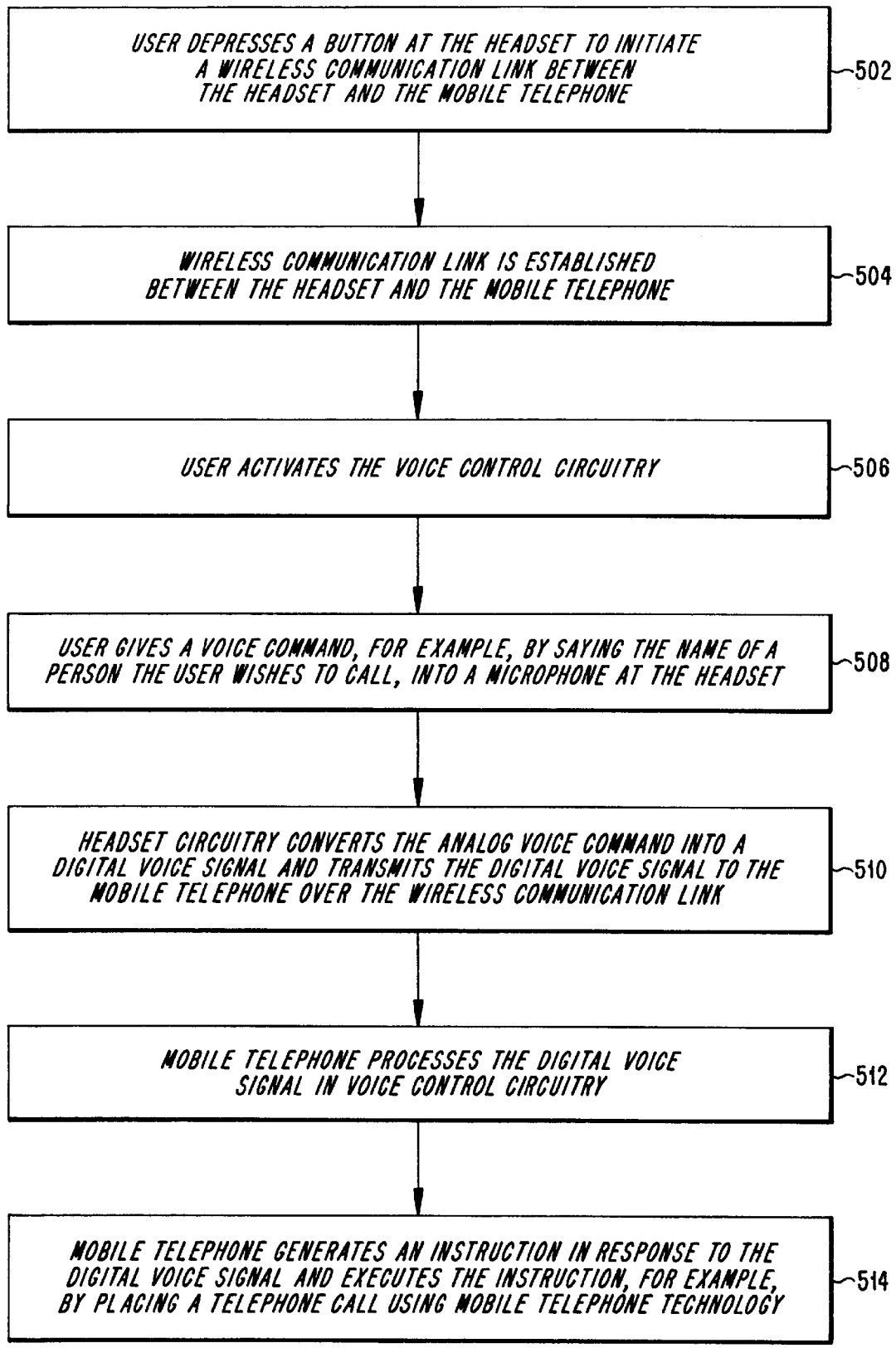
FIG. 5 shows a flow chart describing an outgoing call being placed from a remote control device according to an alternative embodiment of the present invention.

FIG. 5 shows a flow chart describing an outgoing call being placed from remote control device 102 according to one of a number of embodiments of the invention. This embodiment shall be described with reference to remote control device 102 being a headset and electronic device 104 being a mobile telephone. To place an outgoing call, a user depresses a button, or performs some other suitable input maneuver, located on the headset. (Step 502). The depression of the button causes the headset to send one or more first control signals or other data to the mobile telephone and the mobile telephone to send one or more second control signals or other data to the headset in response. After this exchange of signals and data, the wireless communication link (e.g., a Bluetooth connection) between the headset and the mobile telephone is established. (Step 504). The user then depresses the button again with a short press to activate the voice control circuitry, if the voice control circuitry is not already activated. (Step 506). The depression of the button causes the headset to send a control signal to the mobile telephone to activate the voice control circuitry and the mobile telephone acknowledges the activation in a signal to the headset. The user then gives a voice command or signal, for example, by saying the name of the person the user wishes to call into a microphone of the headset. (Step 508). Circuitry in the headset, such as an analog-to-digital converter, converts this analog voice signal into a digital voice signal and transmits the digital voice signal to the mobile telephone. (Step 510). The mobile telephone processes the voice signal in voice control circuitry. (Step 512). If the voice signal is recognized by the voice control circuitry, by comparing the voice signal with stored voice signals, the circuitry generates an instruction corresponding to the voice signal. The mobile telephone then executes the instruction by placing the telephone call according to known mobile telephone technology. (Step 514). If the voice signal is not recognized by the voice control circuitry after comparing the voice signal with stored voice signals, the circuitry does not generate an instruction.

Figure 6:
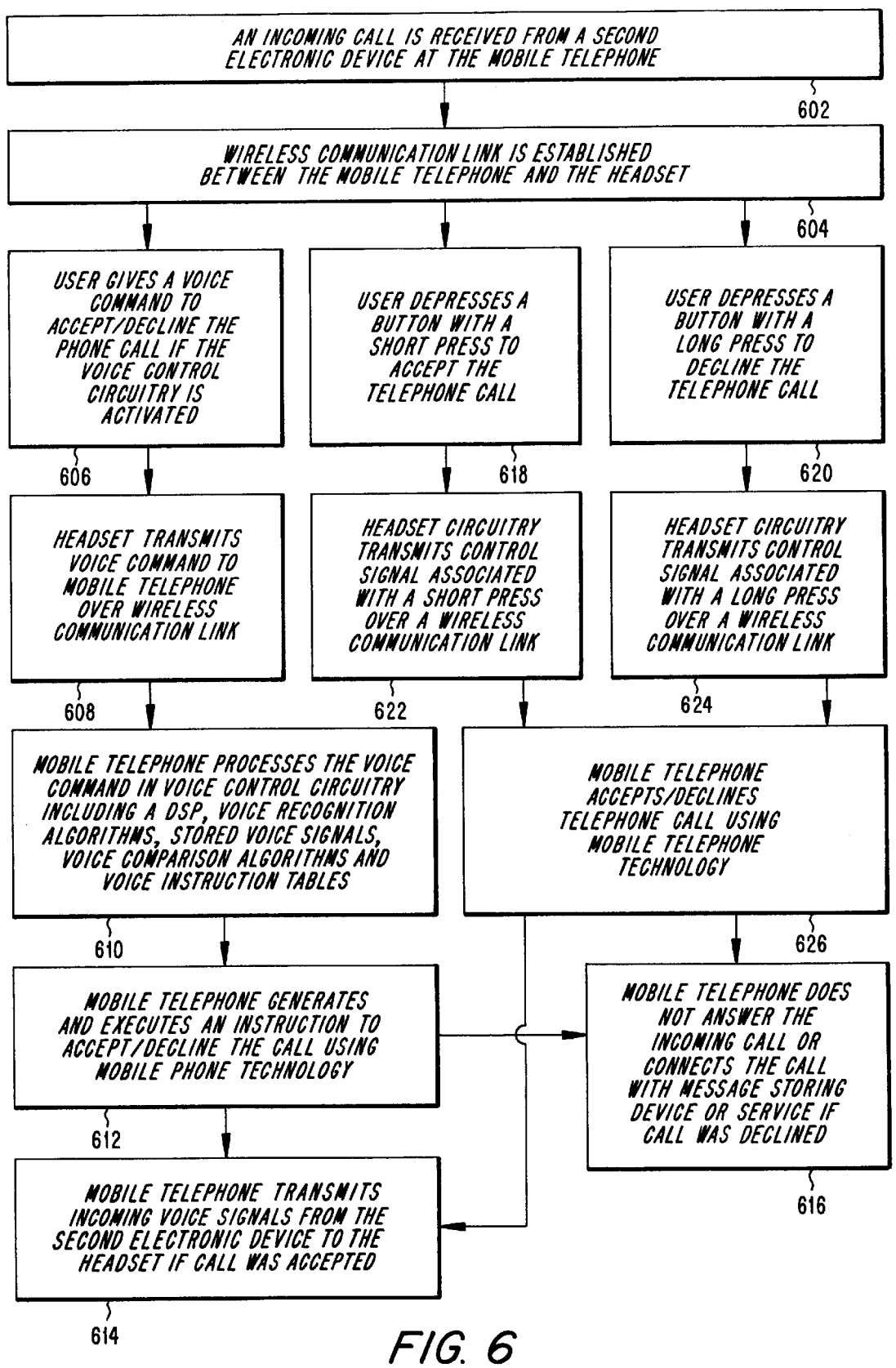
FIG. 6 shows a flow chart describing an incoming call being sent to a remote control device according to an alternative embodiment of the present invention.

FIG. 6 shows a flow chart describing an incoming call being sent to remote control device 102 according to an alternative embodiment of the present invention. This embodiment shall also be described with reference to remote control device 102 being a headset and electronic device 104 being a mobile telephone. An incoming call is received from a second electronic device at the mobile telephone using known mobile telephone technology. (Step 602). The mobile telephone sends one or more first control signals or other data to the headset to establish a wireless communication link (e.g., a Bluetooth connection). The headset sends one or more second control signals or other data to the mobile telephone in response. After this exchange of signals and data, the wireless communication link between the headset and the mobile telephone is established. (Step 604). The mobile telephone sends a signal to the headset informing the user that a call is incoming. The user can choose to accept or decline receiving the call.

If voice control circuitry is activated in the mobile telephone, the user can give a voice command or signal into a microphone of the headset to accept or decline receiving the call. (Step 606). In this case, the process is similar to that described above with respect to FIG. 5. Circuitry in the headset converts the voice signal from an analog signal to a digital voice signal. The headset transmits the digital voice signal to the mobile telephone over the wireless communication link. (Step 608). The mobile telephone processes the voice signal in voice control circuitry. (Step 610). If the voice signal is recognized by the voice control circuitry, by comparing the voice signal with stored voice signals, the circuitry generates an instruction corresponding to the voice signal.

The mobile telephone then executes the instruction by accepting or declining the telephone call. (Step 612). If the mobile telephone is instructed to accept the call, the mobile telephone then transmits incoming voice signals from the second electronic device to the headset. (Step 614). If the mobile telephone is instructed to decline the call, the mobile telephone does not answer the incoming call. (Step 616). Alternatively, the mobile telephone can connect the call with a message storing device or service or perform some other suitable function. (Step 616).

If the voice signal is not recognized by the voice control circuitry after comparing the voice signal with stored voice signals, the circuitry does not generate an instruction.

If voice control circuitry is not activated in the mobile telephone, the user can depress a button, or perform some other suitable input maneuver, on the headset to accept or decline the call. For example, the user can depress the button with a short press if the user wishes to accept the call. (Step 618). The user can depress the button with a long press if the user wishes to decline the call. (Step 620). The depression of the button causes the headset to send a control signal to the mobile telephone to accept or decline the call. (Steps 622 and 624). The mobile phone acknowledges the action in a return signal to the headset. The mobile telephone then accepts or declines the incoming call in accordance with mobile telephone technology. (Step 626). If the mobile telephone is instructed to accept the call, the mobile telephone transmits incoming voice signals from the second electronic device to the headset. (Step 614). If the mobile telephone is instructed to decline the call, the mobile telephone does not answer the incoming call. (Step 616) Alternatively, the mobile telephone can connect the call with a message storing device or service or perform some other suitable function. (Step 616).

In the above embodiments, the wireless communication link is established or opened when communication is desired and terminated or closed once communication is no longer desired. It is possible for the communication link between the remote control device and the electronic device to remain open, even when communication is no longer required. However, this may not be desirable because to maintain this communication link, the battery supplying power to the remote control device will be drained at a faster rate.

The invention has been described with reference to particular embodiments. However, it will be readily apparent to those skilled in the art that it is possible to embody the invention in specific forms other than those of the preferred embodiments described above. This may be done without departing from the spirit of the invention.

For example, the electronic device being controlled has been exemplified by a mobile telephone 104. However, this is not essential. Rather, the inventive techniques can be adapted to control any number of other devices, such as a computer (desktop or otherwise), or any of the other devices mentioned earlier.

Furthermore, the remote control device 102 has been illustrated by a headset or wrist device. However, this is not essential. Rather, the inventive techniques can be adapted for use in any other type of device having characteristics described herein with respect to the remote control device 102.

Still further, the remote control device 102 has been described as a device having a single button 106, with user commands distinguished from one another based on whether a long or short press has been performed. In other embodiments, further distinctions between commands can be made by further differentiating between other length presses, and/or between numbers of short and/or long presses.

Still further, the remote control device 102 need not be limited to having one button. It could have, for example, two or more buttons, with different functions being assigned to different buttons. For example, one button could indicate "volume up", while another button indicates "volume down". In other device states, these same (or other) two buttons might respectively indicate "initiate communication" and "terminate communication". Having two or more buttons instead of just one has the advantage of reducing errors in control, in which, for example, a user intends for a button activation to be short, but inadvertently holds it down long enough to register as a long press.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling an electronic device with a remote control device, the method comprising the steps of:
    establishing a wireless communication link between the electronic device and the remote control device over which data signals and voice signals may be transmitted;
    receiving a voice signal at the remote control device;
    transmitting the voice signal from the remote control device to the electronic device via the wireless communication link;
    receiving the voice signal at the electronic device;
    generating an instruction responsive to the voice signal in the electronic device;
    executing the instruction in the electronic device;
    transmitting at least one signal from the remote control device to the electronic device to elicit a response from the electronic device;
    transmitting an operational status of the electronic device in response to one of the at least one signal;
    storing the operational status in a memory unit in the remote control device,
    updating the operational status of the electronic device; and
    changing an operational status of the remote control device in response to the updating step.

2. The method of claim 1, wherein the establishing step is responsive to a user input at the remote control device, the establishing step comprising the steps of:
    transmitting at least one first signal from the remote control device to the electronic device requesting that the wireless communication link be established; and
    transmitting at least one second signal from the electronic device to the remote control device indicating that the wireless communication link is established.

3. The method of claim 1, wherein the establishing step is responsive to an event at the electronic device, the establishing step comprising the steps of:
    transmitting at least one first signal from the electronic device to the remote control device requesting that the wireless communication link is established; and
    transmitting at least one second signal from the remote control device to the electronic device indicating that the wireless communication link is established.

4. The method of claim 3, wherein the electronic device is a mobile telephone and the event is an incoming telephone call.

5. The method of claim 1, wherein the wireless communication link is a Bluetooth connection.

6. The method of claim 1, wherein:
    the electronic device includes voice control circuitry,
    one of the at least one signal requests voice activated dialing, and
    the elicited response includes the electronic device utilizing the voice control circuitry.

7. The method of claim 1 wherein the at least one signal is an AT command.

8. The method of claim 1, further comprising the step of converting the voice signal from an analog signal to a digital signal prior to the transmitting step.

9. The method of claim 1, wherein the electronic device is a computer.

10. The method of claim 1, wherein the remote control device is a headset.

11. The method of claim 1, wherein the electronic device is a mobile telephone.

12. The method of claim 11, wherein:
    the electronic device includes voice control circuitry,
    one of the at least one signal requests voice activated dialing,
    the elicited response includes the electronic device utilizing the voice control circuitry,
    the voice signal indicates that a user desires to place a telephone call to an entity, and
    the instruction instructs the electronic device to call the entity.

13. The method of claim 1, wherein the electronic device is a communication device engaged in an ongoing call, and further comprising the steps of:
    in the electronic device, detecting that the wireless communication link has been broken;
    in response to said detection, starting a timer;
    upon expiration of a predetermined timeout period, terminating the ongoing call.

14. The method of claim 13, further comprising the step of detecting user intervention within the predetermined timeout period, and in response thereto stopping the timer and maintaining the ongoing call.

15. A wireless, voice-activated remote control system for controlling an electronic device, the system comprising:
- an electronic device comprising a microphone, a speaker, an antenna, wireless link circuitry, and voice control circuitry;
- a remote control device comprising a microphone, a speaker, an antenna, wireless link circuitry, and a user input device, wherein at least one voice signal is input into the microphone of the remote control device; and
- a wireless communication link between the electronic device and the remote control device over which data signals and voice signals may be transmitted; wherein:
  - the voice signal is transmitted from the remote control device to the electronic device via the wireless communication link,
  - the voice signal is received at the electronic device,
  - the voice control circuitry generates an instruction responsive to the voice signal and the instruction is executed in the electronic device,
  - the remote control device transmits at least one signal to the electronic device to elicit a response from the electronic device,
  - the electronic device transmits an operational status of the electronic device in response to one of the at least one signal,
  - the remote control device stores the operational status in a memory unit in the remote control device,
  - the electronic device updates its operational status with the remote control device, and
  - the remote control device changes an operational status of the remote control device in response to the updated operational status of the electronic device.

16. The system of claim 15, wherein:
- the wireless communication link is established in response to a signal from the user input device,
- the remote control device transmits at least one first signal to the electronic device requesting that the wireless communication link be established, and
- the electronic device transmits at least one second signal to the remote control device indicating that the wireless communication link is established.

17. The system of claim 15, wherein:
- the wireless communication link is established in response to an event at the electronic device,
- the electronic device transmits at least one first signal to the remote control device requesting that the wireless communication link be established; and
- the remote control device transmits at least one second signal to the electronic device indicating that the wireless communication link is established.

18. The system of claim 17, wherein the electronic device is a mobile telephone and the event is an incoming telephone call.

19. The system of claim 18, wherein:
- the electronic device includes voice control circuitry,
- one of the at least one signal requests voice activated dialing, and
- the elicited response includes the electronic device utilizing the voice control circuitry.

20. The system of claim 18, wherein the at least one signal is an AT command.

21. The system of claim 15, wherein the wireless communication link is a Bluetooth connection.

22. The system of claim 15, further comprising an analog to digital converter for converting the voice signal from an analog signal to a digital signal prior to transmitting the voice signal to the electronic device.

23. The system of claim 22, wherein:
- the remote control device transmits at least one signal to the electronic device to elicit a response from the electronic device,
- one of the at least one signal requests voice activated dialing,
- the elicited response includes the electronic device utilizing the voice control circuitry,
- the voice signal indicates that a user desires to place a telephone call to an entity, and
- the instruction instructs the electronic device to call the entity.

24. The system of claim 15, wherein the electronic device is a computer.

25. The system of claim 15, wherein the remote control device is a headset.

26. The system of claim 15, wherein the electronic device is a mobile telephone.

27. The system of claim 15, wherein the electronic device is a communication device engaged in an ongoing call, and further comprising:
- in the electronic device, logic configured to detect that the wireless communication link has been broken;
- a timer;
- logic configured to start the timer in response to said detection;
- logic configured to terminate the ongoing call in response to expiration of a predetermined timeout period.

28. The system of claim 27, further comprising:
- logic configured to detect user intervention within the predetermined timeout period; and
- logic configured to stop the timer and maintain the ongoing call in response to said detected user intervention.

* * * * *